Feb. 21, 1933.  E. R. BROKVIST ET AL  1,897,999
AUTOMATIC COOKING MACHINERY
Filed June 11, 1932   2 Sheets-Sheet 1
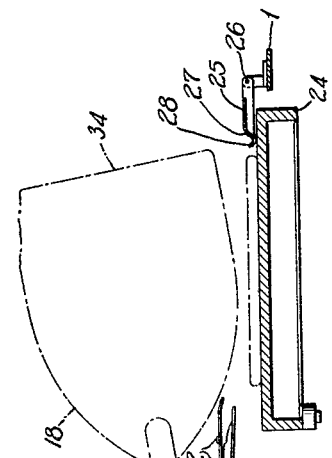
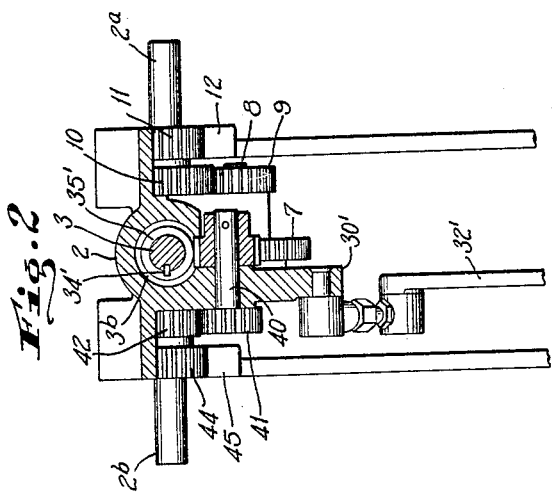
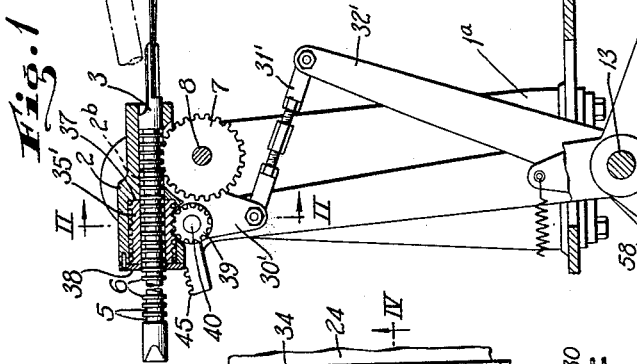
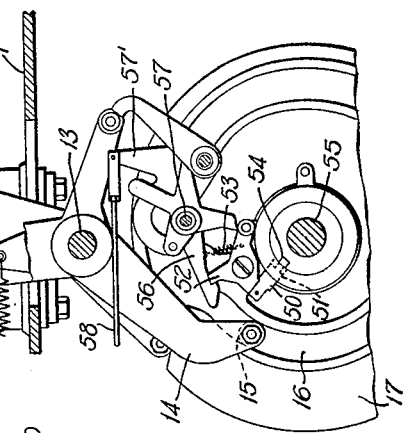
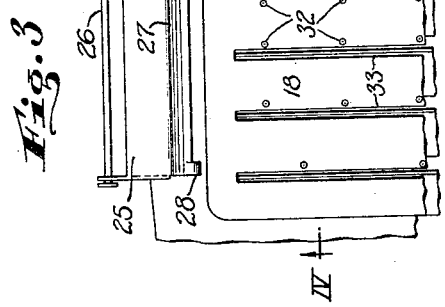
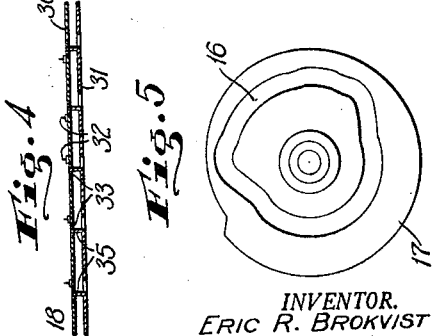
INVENTOR.
ERIC R. BROKVIST
CHARLES A. FAUSEL
BY
H. Russell Bond ATTORNEY.

Feb. 21, 1933.  E. R. BROKVIST ET AL  1,897,999
AUTOMATIC COOKING MACHINERY
Filed June 11, 1932   2 Sheets-Sheet 2
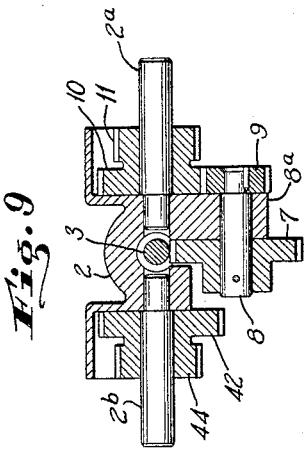
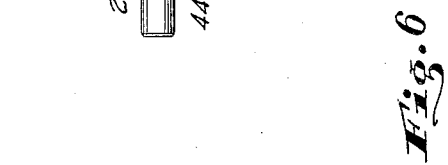
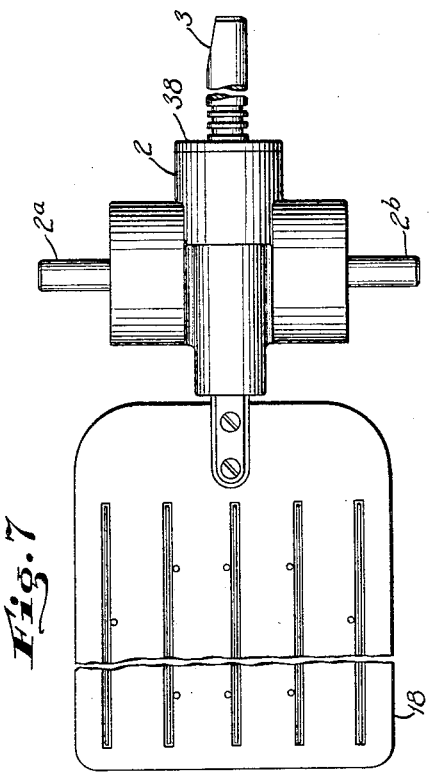
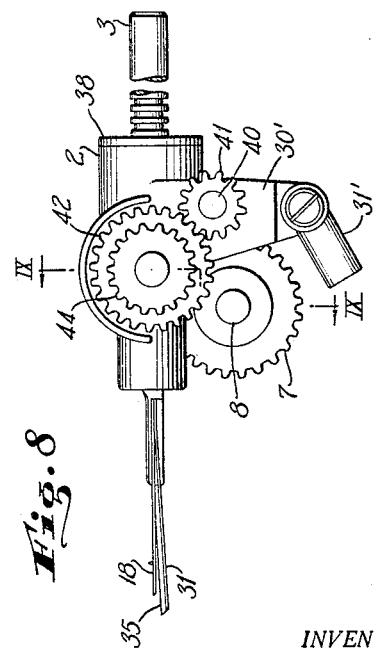
INVENTOR.
ERIC R. BROKVIST
CHARLES A. FAUSEL
BY
ATTORNEY.

Patented Feb. 21, 1933

1,897,999

UNITED STATES PATENT OFFICE

ERIC R. BROKVIST, OF BROOKLYN, NEW YORK, AND CHARLES A. FAUSEL, OF GLEN-RIDGE, NEW JERSEY, ASSIGNORS TO HARRY RUSSELL BRAND, OF NEW YORK, N. Y.

AUTOMATIC COOKING MACHINERY

Application filed June 11, 1932. Serial No. 616,598.

This invention relates to automatic cooking machinery and with regard to its more specific features to mechanisms designed to pick up a cooked or partially cooked article such as a cake, biscuit or the like, which may herein be generically referred to as a cake.

It is an object of this invention to provide a new and improved mechanism of the character described, which will readily pick up a cake from a cooking surface, but which, when it has picked up a cake it will retain the cake firmly in place.

This mechanism is especially applicable for use in machines for automatically cooking pancakes, biscuits or the like which are cooked upon a griddle. That particular embodiment is therefore chosen for illustration.

It is a further object of the invention, therefore, to provide a peel which may be readily inserted beneath a cake but which when the cake rests thereon and has been lifted from the griddle will prevent dislodgment so that the cake may be handled while upon the peel and when desired may be turned over without prematurely slipping from the peel.

It is a further object to provide a mechanism which may be slid under a cake and turned over with the cake upon it, and which will nevertheless deposit the cake in the proper position with regard to the griddle.

It is a further object to associate with a peel and the mechanism for operating the same, a stop which will cooperate to force the cake to mount the peel when desired, but to design the mechanism in a manner to prevent interference between the stop and the normal path of travel of the cake either before or after being turned over.

Other objects of the invention will in part be given and will in part appear hereinafter.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention reference should be had to the following detailed description taken in connection with the accompanying drawings, in which:

Figure 1 is an elevation of a machine embodying this invention, parts being broken away to show the construction.

Fig. 2 is a section on the line II—II of Fig. 1.

Fig. 3 is a fragmentary plan view of a peel embodying the invention.

Fig. 4 is a section on the line IV—IV of Fig. 3.

Fig. 5 is an elevation of the cam used for advancing the peel, shown in this view on a reduced scale.

Fig. 6 is an elevation of the cams used for tilting the peel and for rotating the peel respectively, being a view of the cam block from the opposite side from Fig. 5.

Fig. 7 is a top plan view of the peel and a trunnion sleeve therefor.

Fig. 8 is a view in side elevation of the same.

Fig. 9 is a view in transverse section taken on the line IX—IX of Fig. 8.

In the drawings the numeral 1 designates a frame work to which is attached an upright bracket 1a. The upper end of this bracket 1a carries a sleeve 2 which is mounted for oscillatory movement on trunnions 2a and 2b respectively, for a purpose to be described. Within the sleeve 2 is slidably mounted a rod 3 which has throughout the major portion of its length, a plurality of circumferential grooves 5 defining circumferential gear teeth 6 adapted to mesh with a gear 7 fixed upon a shaft 8 journalled in an arm 8a depending from the sleeve 2. The other end of this shaft 8 carries a pinion 9 meshing with a gear 10 fixed to rotate with another gear 11 on the trunnion 2a. The latter gear in turn meshes with a gear segment 12 pivoted to the main frame 1 about a shaft 13.

The gear segment 12 has a lower arm 14 carrying a roller 15 moving in a cam groove 16 upon one face of a cam wheel 17. In this manner the oscillation of the segment 12 and hence the rotation of the gear 7 will advance and retract the rod 3 through the cooperation of the gear 7 and the gear teeth 6. Fixed to the rod 3 is a peel which is generally indicated by the numeral 18.

The numeral 24 designates a griddle on which the cakes may be cooked and it is preferably movable with respect to the peel so that successive cakes are presented to the peel for manipulation. The griddle may be, as illustrated, in the form of an annular plate rotating about its axis and successively presenting the cakes in turn.

Opposite to the peel and adjacent to the griddle 24, a stop 25 is pivoted at 26 to the main frame 1. This stop and the peel are arranged to be moved relative to each other after the peel has picked up the cake, so that the cake and peel may be out of the way of the stop. For this purpose either peel or stop may be moved, but a more simple construction is obtained by withdrawing the peel. The stop need not therefore be made laterally movable. As illustrated it is provided with an outer edge 27 which is inclined downwardly toward the griddle and the peel, and is provided with two upturned extensions 28 at its extremities adapted to encounter the peel and lift the stop as the peel slides beneath it. By reason of the fact that the edge 27 is inclined toward the griddle and toward the cake, it materially facilitates the retaining of the cake in place while the griddle slides beneath it because it will be understood that the lower half of the cake is dried by the cooking while the upper half may be still sticky. The inclination of the edge 27, therefore, causes the peel to retain the cake in place by contact with the sticky upper portion.

Moreover, by reason of the fact that the extensions 28 are at the ends of the stop, it will be understood that the cake which is more or less circular in form, will when urged toward the stop by the peel, encounter the center portion of the edge 27 without touching the projections 28. Moreover, by reason of the fact that the stop is pivoted as at 26 and because of the shape of the extensions 28, the stop will remain in contact with the griddle until the peel encounters it, whereupon the stop will lift sufficiently to allow the peel to slide beneath it.

This partial withdrawal of the peel sufficient to disengage it and the cake from the stop 25 and bring the cake back into desired registry with the griddle is accomplished by a corresponding displacement in the cam groove 16 as will be clear to those skilled in the art.

The peel is designed to be slid with ease beneath the cake but to retain the cake thereafter against sliding off even as the cake is turned over. To this end the peel is provided with a smooth surface onto which the cake may slide and this is replaced by a roughened surface after the cake is in place. As illustrated the peel comprises an upper plate 30 and a lower plate 31. The upper plate 30 has a plurality of upwardly projecting pins 32 which serve to prevent the cake slipping in any direction when the cake rests upon the pins. The plate 30 is provided with a plurality of longitudinal slots 33 extending from a point adjacent to the forward edge 34 to a point beyond which the cake will not extend. The lower plate 31 has a plurality of upwardly extending ribs 35 which may conveniently be cut directly from its surface and bent upwardly. These ribs are adapted to extend into and through the slots 33 in the plate 30 and the ribs are of sufficient height so that when the plates 30 and 31 are in contact with each other, the upper surface of the ribs will extend materially above the upper end of the pins 32, so that while the plates 30 and 31 are in contact, a cake may be readily slid over the surface of the peel in the direction of extension of the rib 35 without encountering the pins 32.

The plates 30 and 31 are jointly springheld by the rod 3 in such a manner that the plate 31 normally diverges from the plate 30 sufficiently to withdraw the ribs 35 below the level of the top of the pins 32, but as the peel is lowered into contact with the griddle the contact is first made by the outer edge of the plate 31 which is thereby pressed upwardly until it comes into contact with the plate 30. The ribs 35 therefore are in position to furnish a smooth pathway over which the cake may slide as the peel is forced forward.

The sleeve 2 has depending therefrom an arm 30' connected by a link 31' to a lever 32' also pivoted about the shaft 13. The other end of this lever 32' is controlled by a cam groove upon the other side of the cam wheel 17 to cause the depression of the peel just before it is projected forwardly and the raising of the peel after the cake is upon it and while the cake is turned and the peel withdrawn.

Journalled in the sleeve 2 and splined to the rod 3, as shown at 34', is a sleeve 35' carrying upon its outer surface spiral gear teeth 36 and this sleeve is confined in its longitudinal movement in one direction by a shoulder 37 upon the sleeve 2 and in its other direction by a cap 38. A spiral gear 39 meshes with the spiral teeth 36 and by its rotation causes rotation of the sleeve 35' and hence of the peel. The gear 39 is fixed on a shaft 40 journalled in the arm 30'. Also fixed on the shaft 40 is a gear 41 which meshes with a gear 42 fixed to rotate with a gear 44 on the trunnion 2b. This gear 44 in turn meshes with a gear segment 45 also journalled about the shaft 13 and controlled by a cam groove in the cam wheel 17 in like manner to the control of the segment 12 and this cam groove is so designed as to cause the peel to turn over after it has been inserted beneath the cake and raised above the surface of the griddle. The exact construction of the cam grooves controlling the arm 32' and segments 45 forms no part of the present invention. The particular form shown in the present embodiment, however, is illustrated in Fig. 6 in which the cam groove 65 and a follower roller 66 cooperate to move the arm 32' to tilt the peel downwardly to engage the griddle, and the cam groove 60 cooperates with the cam follower roller 61 to control the arm 45 to rotate the peel.

Means may be employed to start the trains of mechanism to start the peel at a predetermined time, comprising a key 50 moving in a bore 51 in the hub of the cam wheel 17 and pivoted to a dog 52 pivoted to the cam wheel. This dog is operated by a spring 53 to urge the key 50 into a slot 54 in the shaft 55. A latch 56 is pivoted on the main frame at 57 in position to engage an upraised arm of the dog 52 so that as the cam wheel comes to its position of rest, as shown in Fig. 1, the key 50 is withdrawn from slot 54, permitting the shaft to rotate without moving the peel. The latch 56 may be raised automatically when desired by an arm 57' controlled by a rod 58. These features form no part of the present invention and need not be further described.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

Having described our invention, what we claim as new and desire to secure by Letters Patent, is:—

1. In a machine for cooking cakes in combination a peel for lifting cakes from a griddle, and means associated with said peel engaging only the under surface of the cake for preventing said cakes from sliding off said peel as the peel is turned, and means for preventing engagement of the cake by said engaging means until the cake rests upon the peel.

2. A cake peel having a roughened cake receiving surface, and means engageable by a griddle and thereby actuated to lift the cake over said roughened surface.

3. A cake peel having a roughened cake receiving surface, and means engageable by a griddle and thereby actuated to render said roughened surface inaccessible to the cake until the cake is in place.

4. A device of the character described comprising in combination a griddle, a peel for lifting cakes from said griddle and means for advancing said peel beneath said cake beyond the normal position of said cakes upon said griddle and means for subsequently withdrawing said peel back to said normal position of said cake.

5. A peel including a roughened surface and slide surface including means for presenting said slide surface to said cake while inserting the peel beneath the cake and means for automatically depositing said cake upon said roughened surface when it has been lifted from the griddle.

6. A peel including a cake receiving surface having a roughened surface and means for supporting said cake above said roughened surface, including means for removing said support.

7. A peel including a part having a smooth surface and a member mounted for movement above and below said smooth surface and affording a roughened surface, and means for lowering said member below said smooth surface to assist in the insertion of a peel beneath the cake and means for raising said member above said smooth surface when said cake has been lifted.

8. A peel including a pair of members spring held in vertical spaced relation, one of said members being provided with a cake supporting surface and the other of said members having means extending upwardly through said first mentioned member and movable from a position above to a position below said cake supporting surface.

9. A peel including a member presenting a smooth surface to a cake in the direction of relative movement of the cake and having a griddle engaging portion and a second member having a roughened surface and means for supporting said second member in position to have its roughened surface extend above said smooth surface, said smooth surface member being resiliently mounted whereby as it engages the griddle, it may cause said smooth surface to extend above the level of said roughened surface.

10. A peel including a member presenting a smooth surface to a cake in the direction of relative movement of the cake and having a griddle engaging portion and a second member having a roughened surface and means for supporting said second member in position to have its roughened surface extend above said smooth surface and means engageable by the griddle for raising one of said surfaces above the other.

11. A cake peel including a member having a roughened cake supporting surface and means for supporting the cake above the level of said roughened surface and means for withdrawing said supporting means from cooperation with the cake when the cake has been placed upon the peel.

12. A device of the character described including a griddle, a peel mounted adjacent to said griddle, means for placing said peel upon the griddle adjacent to a cake position and for advancing the same to lift the cake, and a stop adapted to engage the far edge of the cake to prevent the same from moving and means for thereafter partially withdrawing said peel and stop away from each other and for subsequently lifting the cake.

13. A device of the character described including a griddle, a peel mounted adjacent to said griddle, means for placing said peel upon the griddle adjacent to a cake position and for advancing the same to lift the cake, and a stop adapted to engage the far edge of the cake to prevent the same from moving and means for thereafter partially withdrawing said peel away from said stop and for subsequently lifting the cake.

14. A device of the character described including in combination a griddle, a peel and a stop for resisting the movement of a cake in response to the movements of said peel, said stop being pivoted adjacent to the edge of said griddle to permit said peel to slip beneath it, said stop having a downwardly and inwardly inclined cake engaging surface.

15. A device of the character described including in combination a griddle, a peel and a stop for resisting the movement of a cake in response to the movements of said peel, said stop being pivoted adjacent to the edge of said griddle to permit said peel to slip beneath it.

16. A device of the character described including in combination a griddle, a peel and a stop for resisting movement of a cake in response to the movements of said peel, said stop being pivoted adjacent to the edge of said griddle to permit said peel to slip beneath it and an inwardly and upwardly inclined face upon the edge of said stop to act as a cam surface to lift said peel.

17. A device of the character described comprising in combination a griddle, a peel and a stop, and means for advancing the peel beneath a cake to encounter said stop, and means for relatively moving the peel and stop apart before other handling of the cake.

18. A device of the character described comprising in combination a peel comprising a pair of relatively movable superposed metal elements and a stop to assist in forcing a cake upon the peel and means for moving the peel and stop relative to each other after the cake is in place before other handling of the cake.

In testimony whereof, we have signed this specification.

ERIC R. BROKVIST.
CHARLES A. FAUSEL.